(12) United States Patent
Fischer et al.

(10) Patent No.: US 11,852,850 B2
(45) Date of Patent: Dec. 26, 2023

(54) LIGHTING ASSEMBLIES FOR VEHICLES

(71) Applicant: Nissan North America, Inc., Franklin, TN (US)

(72) Inventors: Chiray Fischer, Farmington Hills, MI (US); Jason Nantais, Royal Oak, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/682,117

(22) Filed: Feb. 28, 2022

(65) Prior Publication Data

US 2023/0273353 A1    Aug. 31, 2023

(51) Int. Cl.
*G02B 5/02* (2006.01)

(52) U.S. Cl.
CPC ......... *G02B 5/0294* (2013.01); *G02B 5/0221* (2013.01); *G02B 5/0278* (2013.01)

(58) Field of Classification Search
CPC ...... F21S 41/323; F21S 41/692; F21S 41/695; F21S 41/322; F21S 43/239; F21S 43/241; F21S 41/24
See application file for complete search history.

(56) References Cited

U.S. PATENT DOCUMENTS

| | | | | |
|---|---|---|---|---|
| 5,287,101 A * | 2/1994 | Serizawa | ................. | B60Q 1/28 340/815.76 |
| 5,707,130 A * | 1/1998 | Zwick | ................... | F21S 43/239 362/545 |
| 7,374,322 B2 * | 5/2008 | Steen | ..................... | B60Q 1/263 362/546 |
| 10,260,693 B1 * | 4/2019 | Shih | ...................... | F21S 43/243 |
| 2005/0162857 A1 * | 7/2005 | Tsukamoto | ........... | F21S 41/155 362/509 |
| 2005/0180158 A1 * | 8/2005 | Komatsu | ................. | F21S 41/24 362/509 |
| 2012/0201033 A1 * | 8/2012 | Otani | ..................... | F21S 41/43 362/307 |
| 2012/0327677 A1 * | 12/2012 | Furukawa | ............. | F21S 41/153 362/297 |
| 2019/0346106 A1 * | 11/2019 | Herlin | .................. | G02B 6/0045 |

* cited by examiner

*Primary Examiner* — Eric T Eide
(74) *Attorney, Agent, or Firm* — Young Basile Hanlon & MacFarlane, P.C.

(57) ABSTRACT

The present disclosure describes lighting assemblies (e.g., taillight assemblies) for vehicles that diffuse and block light transmission from a centralized light source, which inhibits (if not entirely prevents) the creation and perception of hotspots from one or more points-of-view (e.g., from the sides and/or the rear of the vehicle) while producing a more homogenous overall appearance. In one embodiment of the disclosure, the lighting assembly includes: a light source; a diffuser that is spaced axially from the light source; a lens that is spaced axially from the diffuser; and a shield that is located axially between the diffuser and the lens. The diffuser includes first and second lateral ends and is configured to receive and disperse light from the light source through the lighting assembly. The shield is configured to interfere with light transmission from the light source through the at least one lens and thereby inhibit hotspot perception.

20 Claims, 4 Drawing Sheets

LIGHTING ASSEMBLIES FOR VEHICLES

TECHNICAL FIELD

The present disclosure relates to lighting assemblies for vehicles (e.g., taillights, headlights, etc.). More specifically, the present disclosure relates to lighting assemblies that diffuse and block light transmission to inhibit (if not entirely prevent) the creation and perception of hotspots.

BACKGROUND

Vehicle lighting assemblies include one or more light sources that emit light through one or more lenses. Often times, however, the light sources themselves are visually detectable to an observer, resulting in the perception of one or more "hotspots" (e.g., areas of increased brightness). Additionally, the light sources are often located at (e.g., near or adjacent to) the edges of the lighting assembly, which can result in a nonhomogeneous appearance as brightness decreases across the lighting assembly with distance from the light source.

The present disclosure addresses these issues, however, amongst others, and describes lighting assemblies that diffuse and block light transmission from a centralized light source, which inhibits (if not entirely prevents) the creation and perception of hotspots while producing a more homogenous overall appearance.

SUMMARY

In one aspect of the present disclosure, a lighting assembly for a vehicle is disclosed that includes: a light source; a diffuser that is spaced axially from the light source; a lens that is spaced axially from the diffuser; and a shield that is located axially between the diffuser and the lens. The diffuser includes first and second lateral ends and is configured to receive and disperse light from the light source through the lighting assembly. The shield is configured to interfere with light transmission from the light source through the lens and thereby inhibit axial hotspot perception.

In certain embodiments, the lighting assembly may further include a carrier that is configured to support the diffuser and the lens.

In certain embodiments, the light source may be generally centralized relative to the lens.

In certain embodiments, the carrier may extend axially beyond the first and second lateral ends of the diffuser to inhibit lateral hotspot perception.

In certain embodiments, the shield may include a body with a generally U-shaped configuration defining a receptacle to receive light from the light source.

In certain embodiments, the shield may be supported by the lens.

In certain embodiments, the shield may be heat staked to an inner surface of the lens.

In another aspect of the present disclosure, a lighting assembly for a vehicle is disclosed that includes: a light source; a diffuser that is positioned axially of the light source and which is configured to receive and disperse light from the light source through the lighting assembly; and at least one lens that is positioned axially of the diffuser.

In certain embodiments, the diffuser may be configured to disperse light transversely through the lighting assembly.

In certain embodiments, the at least one lens may include a first lens that is spaced axially from the diffuser, and a second lens that is spaced axially from the first lens.

In certain embodiments, the first lens may include an optically clear material (e.g., a material with no optical effect on the light generated by the light source), and the second lens may include a non-optically clear material (e.g., a material with an optical effect on the light generated by the light source).

In certain embodiments, the light source may include a single light source.

In certain embodiments, the single light source may include at least one lighting element.

In certain embodiments, the at least one lighting element may include a plurality of LEDs.

In another aspect of the present disclosure, a lighting assembly for a vehicle is disclosed that includes: a carrier; a light source that is supported by the carrier and which includes a primary array and a secondary array; a primary diffuser that is supported by the carrier and which is spaced axially from the primary array; a secondary diffuser that is supported by the carrier and which is spaced axially from the secondary array; at least one lens that is supported by the carrier and which is spaced axially from the primary diffuser and the secondary diffuser; a primary shield that is located between the primary diffuser and the at least one lens; and a secondary shield that is located between the primary diffuser and the secondary diffuser. The primary diffuser includes first and second lateral ends and is configured to receive and disperse light from the primary array within the lighting assembly, and the secondary diffuser includes first and second lateral ends and is configured to receive and disperse light from the secondary array within the lighting assembly. The primary shield is configured to interfere with light transmission from the primary array through the at least one lens, and the secondary shield is configured to interfere with light transmission from the secondary array into the primary diffuser.

In certain embodiments, the carrier may be configured to conceal the first and second lateral ends of the primary diffuser as well as the first and second lateral ends of the secondary diffuser to inhibit light transmission from the first and second lateral ends of the primary diffuser and the first and second lateral ends of the secondary diffuser.

In certain embodiments, the primary array may include a first plurality of lighting elements that are arranged in a first orientation, and the secondary array may include a second plurality of lighting elements that are arranged in a second orientation.

In certain embodiments, the second orientation may be transverse in relation to the first orientation.

In certain embodiments, the carrier, the primary diffuser, and the secondary diffuser may be configured such that the primary diffuser and the secondary diffuser are releasably connected to the carrier.

In certain embodiments, the carrier, the primary diffuser, and the secondary diffuser may be fixedly connected.

In certain embodiments, the primary diffuser and the secondary diffuser may be heat staked to the carrier.

BRIEF DESCRIPTION OF THE DRAWINGS

According to common practice, the various features of the drawings may not be to scale and may be arbitrarily expanded or reduced for clarity.

DETAILED DESCRIPTION

The present disclosure describes lighting assemblies (e.g., taillight assemblies) for vehicles that not only reduce the appearance of hotspots, from lateral and/or axial points-of-view (e.g., from the sides and/or the rear of the vehicle), but produce a more homogenous overall appearance, and simplify the electrical componentry.

In one embodiment of the disclosure, the lighting assembly includes a diffuser, which receives and disperses (distributes, spreads) light from a light source, and a shield, which interferes with light transmission through the lighting assembly so as to reduce (if not eliminate) axial hotspot(s).

In another embodiment of the disclosure, the lighting assembly includes a carrier; a primary diffuser; a secondary diffuser; a primary shield; and a secondary shield. The primary diffuser is configured to receive and spread light from a primary light source, and the secondary diffuser is configured to receive and spread light from a secondary light source. The primary shield interferes with light transmission from the primary light source, and the secondary shield interferes with light transmission from the secondary light source, thereby reducing (if not eliminating) multiple hotspots.

Figure 1:
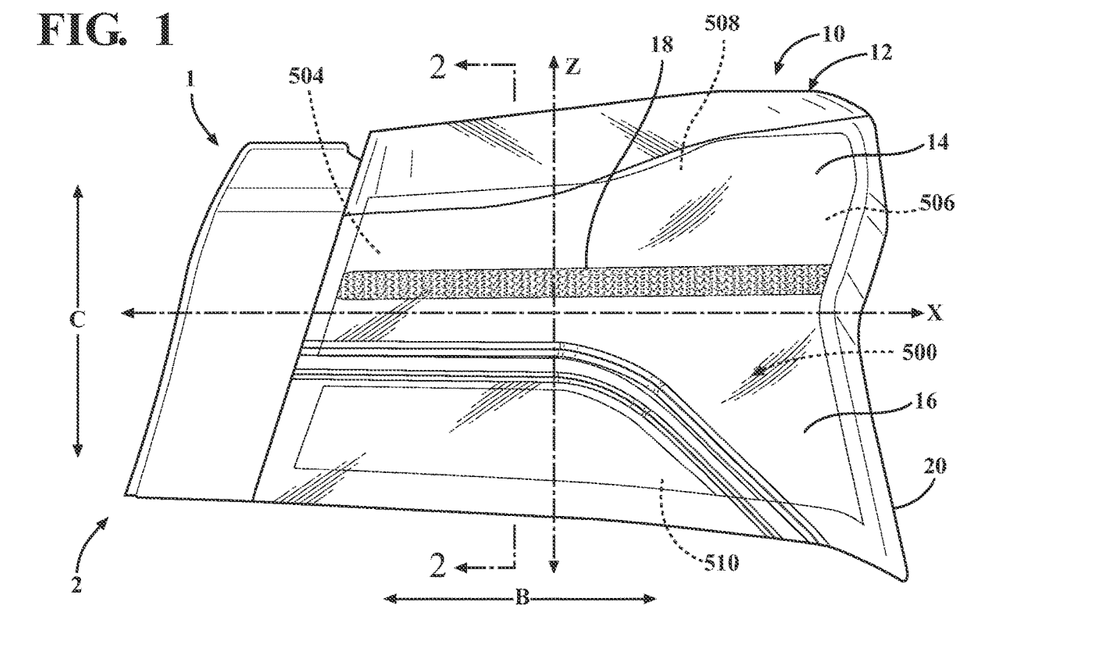
FIG. 1 is a partial, rear, perspective view of a vehicle including a lighting assembly according to the principles of the present disclosure.
Figure 2:
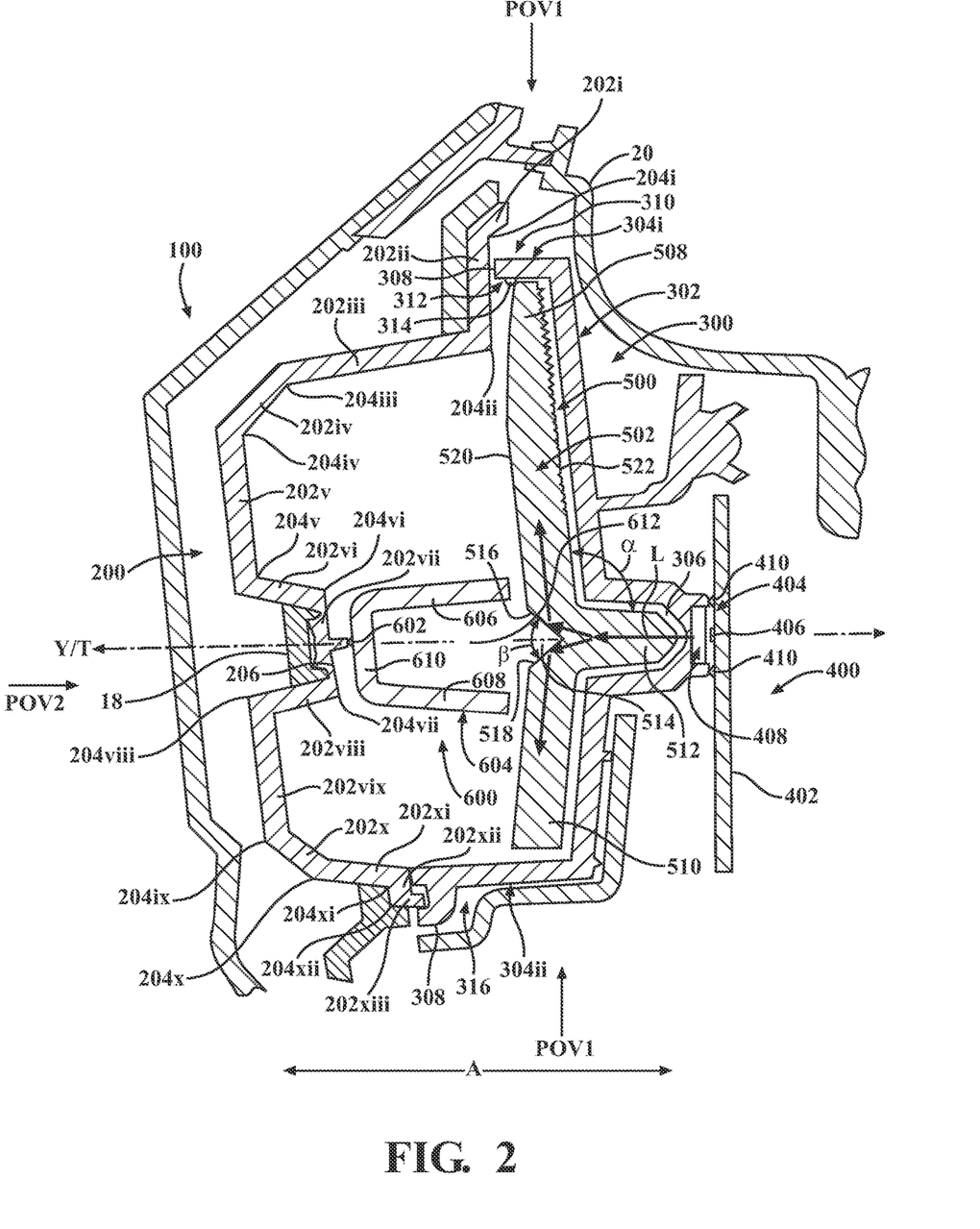
FIG. 2 is a (vertical) cross-sectional view of the lighting assembly taken along line 2-2 in FIG. 1.
Figure 3:
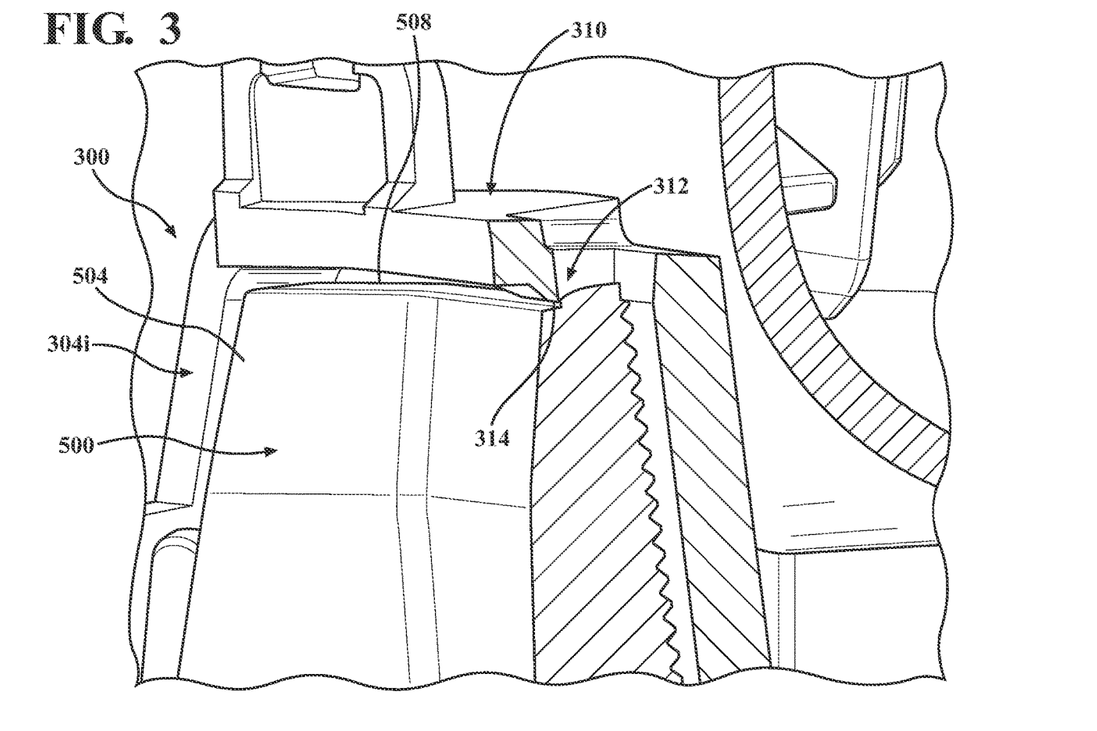
FIG. 3 is a partial, (vertical) cross-sectional view of the lighting assembly shown in perspective.

With reference to FIGS. 1-3, a lighting assembly 10 for a vehicle 1 is illustrated that includes: a (first) outer lens 100; a (second) inner lens 200; a carrier 300; a light source 400; a diffuser 500; and a shield (light blocker) 600. Although illustrated and described in the context of a rear taillight assembly 12 located (positioned) at a rear end 2 of the vehicle 1, it should be appreciated that the principles of the present disclosure are equally applicable to a variety of lighting assemblies 10 (e.g., front headlight assemblies) across a wide range of vehicle platforms (e.g., cars, trucks, SUVs, vans, boats, airplanes, trains, etc.).

The lighting assembly 10 defines a (first) axis X (FIG. 1), which extends in parallel (or generally parallel) relation to a (horizontal, lateral) width B of the vehicle 1, a (second) axis Y (FIG. 2), which extends in parallel (or generally parallel) relation to a length A of the vehicle 1, and a (third) axis Z (FIG. 1), which extends in parallel (or generally parallel) relation to a (vertical) height C of the vehicle 1, as well as a (first) chamber 14 and a (second) chamber 16. The chambers 14, 16 are spaced (vertically) from each other along the axis Z such that the chamber 14 is located (positioned) vertically above the chamber 16. In various embodiments of the disclosure, it is envisioned that the chambers 14, 16 may either be in luminous communication with each other so as to allow light to pass therebetween, or that the chambers 14, 16 may be configured as separate, discrete cavities (compartments, hollows) so as to inhibit (if not entirely prevent) light from passing therebetween.

In the particular embodiment illustrated, the chambers 14, 16 are (vertically) separated by a barrier 18, which is located (positioned) therebetween along the Z axis. In various embodiments of the disclosure, it is envisioned that the barrier 18 may be integrated into the inner lens 200 such that the inner lens 200 and the barrier 18 are integrally (e.g., monolithically, unitarily) formed. Alternatively, it is envisioned that the inner lens 200 and the barrier 18 may be formed as discrete components that are connected (secured) together in any suitable manner. For example, it is envisioned that the inner lens 200 and the barrier 18 may be mechanically connected (secured) via one or more fasteners (e.g., pins, rivets, screws, etc.), either fixedly or removably, that the inner lens 200 and the barrier 18 may be adhesively connected (secured), that the inner lens 200 and the barrier 18 may be heat staked together, etc.

The outer lens 100 is connected (secured) to a housing 20 of the lighting assembly 10 and conceals and protects the internal components thereof (e.g., the inner lens 200, the carrier 300, the light source 400, the diffuser 500, and the shield 600). In the particular embodiment illustrated, the outer lens 100 includes (e.g., is formed partially or entirely from) an optically clear (e.g., transparent) material (or combination of materials), which allows light L generated by (emitted from) the light source 400 to pass therethrough. Embodiments in which the outer lens 100 may be configured to distort light transmission from the light source 400 are also envisioned herein, however (e.g., depending upon the desired aesthetic appearance of the lighting assembly 10, the style of the vehicle 1, etc.). For example, embodiments in which the outer lens 100 may include a colored (e.g., tinted) material are also envisioned herein and would not be beyond the scope of the present disclosure.

The inner lens 200 is located (positioned) inwardly (e.g., forwardly) of the outer lens 100 and defines the overall aesthetic appearance of the lighting assembly 10. The inner lens 200 includes (e.g., is formed partially or entirely from) a non-optically clear material or combination of materials. For example, the inner lens 200 may include a translucent or other such material that colors, distorts, or otherwise transforms the light L generated by (emitted from) the light source 400. The lenses 100, 200 are, thus, non-identical and possess (include) different optical characteristics.

The inner lens 200 is supported by the carrier 300 and may be connected (secured) thereto (either directly or indirectly) in any suitable manner. For example, in the particular embodiment illustrated, the inner lens 200 and the carrier 300 are configured for engagement in a snap (interference) fit arrangement, which facilitates releasable connection of the inner lens 200 and the carrier 300. Embodiments are also envisioned, however, in which the inner lens 200 and the carrier 300 may be mechanically connected (secured) via one or more fasteners (e.g., pins, rivets, screws, etc.), either fixedly or removably, as are embodiments in which the inner lens 200 and the carrier 300 may be adhesively connected (secured) and embodiments in which the inner lens 200 and the carrier 300 may be heat staked together.

In the particular embodiment illustrated, the inner lens 200 includes thirteen segments 202i-202viii, each of which is linear (or generally linear) in configuration, that are sequentially connected (secured together) so as to define twelve joints (interfaces, elbows) 204i-204xii. It should be appreciated, however, that the particular configuration of the inner lens 200 may be altered in various embodiments without departing from the scope of the present disclosure (e.g., depending upon the desired aesthetic appearance of the lighting assembly 10, the style of the vehicle 1, etc.). For example, it is envisioned that the configuration of one or more of the segments 202 may be altered (e.g., one or more of the segments 202 may be non-linear (curved)), that one or more of the segments 202 may be eliminated, and/or that one or more additional segments 202 may be included. It is also envisioned that the angles defined by the joints 204-204xii may be altered to allow for further customization in the particular configuration of the inner lens 200 and, thus, the desired aesthetic appearance of the lighting assembly 10.

Although shown as being integral (e.g., monolithic, unitary) in construction in the particular embodiment illustrated, embodiments also envisioned in which the inner lens 200 may include multiple sections (components), which may be connected (secured) together in any suitable manner.

The carrier 300 is connected (secured) to the housing 20 of the lighting assembly 10 and includes a main body portion 302 and a pair of wings (flanges) 304*i*, 304*ii*. The carrier 300 may include (e.g., may be formed from) any suitable material or combination of materials, whether metallic or non-metallic materials (e.g., one or more plastic materials, polymeric materials, composite materials, etc.). In certain embodiments, it is envisioned that the material(s) used in construction of the carrier 300 may possesses (include) reflective characteristics (properties) to aid in the dispersion (distribution, spreading) of light through the lighting assembly 10 and thereby increase uniformity in the overall aesthetic appearance thereof.

Depending upon the particular configuration of the lighting assembly 10, the style of the vehicle 1, etc., it is envisioned that the carrier 300 may include an integral (e.g., monolithic, unitary) construction, or that the carrier 300 may include multiple sections (components). For example, embodiments are envisioned in which the main body portion 302 and the wings 304 may be formed as discrete components that are subsequently connected (secured) together in any suitable manner (e.g., the main body portion 302 and the wings 304 may be mechanically connected (secured) via one or more fasteners (e.g., pins, rivets, screws, etc.), either fixedly or removably, adhesively connected (secured), and/or heat staked together).

The main body portion 302 extends laterally (horizontally) along the axis X and supports the diffuser 500. More specifically, the main body portion 302 includes (defines) a cavity 306 (or other such recess), which extends forwardly (away from the outer lens 100) and is configured to receive the diffuser 500, as described in further detail below.

The wings 304 extend axially (longitudinally) from the main body portion 302 in parallel (or generally parallel) relation to the axis Y. More specifically, as seen in FIG. 2, the wings 304 extend transversely from (e.g., in orthogonal (or generally orthogonal) relation to) the main body portion 302 and terminate in ends 308 that are positioned axially (e.g., rearwardly) beyond the diffuser 500, whereby the diffuser 500 nests within the carrier 300. Nesting of the diffuser 500 within the carrier 300 inhibits (if not entirely prevents) the lateral (horizontal) transmission of light L from lighting assembly 10, which reduces (if not entirely eliminates) the formation and perception of lateral hotspots that may be otherwise perceived from the side(s) of the vehicle 1 (e.g., from the POV (point-of-view) 1 identified in FIG. 2) and/or leakage (direction) of the light L around the carrier 300 in an undesirable manner.

The light source 400 is configured to generate and transmit (emit) light L (FIG. 2), and may include any configuration and collection of components suitable for that intended purpose. For example, in the particular embodiment illustrated, the light source 400 includes a board 402 (e.g., a circuit board, etc.) that supports one or more lighting elements 404 (e.g., LEDs 406) that are arranged into a (primary, first) array 408, which is oriented (angled) towards the diffuser 500 such that the light L generated by (emitted from) the light source 400 via the lighting element(s) 404 enters the diffuser 500. In the particular embodiment illustrated, the light source 400 includes a single lighting element 404 that is positioned in a centralized (or generally centralized) location (relative to the outer lens 100 and/or the inner lens 202) along the X and Z axes (FIG. 1), which improves light distribution across the diffuser 500 and creates a more homogeneous overall appearance in the lighting assembly 10. Embodiments in which the light source 400 may include a plurality of lighting elements 404 are also envisioned herein, however, as are embodiments in which the light source 400 (e.g., the lighting element(s) 404) may be eccentrically positioned (e.g., off-center relative to the inner lens 202) along the X axis and/or the Z axis (e.g., depending upon the particular configuration of the lighting assembly 10, the style of the vehicle 1, etc.), as are embodiments.

The light source 400 is supported by (connected to, secured to) the carrier 300 and is positioned to facilitate luminous communication between the light source 400 and the diffuser 500. More specifically, the light source 400 is located (positioned) inwardly (e.g., forwardly) of the diffuser 500 and faces outwardly (rearwardly), which facilitates the direct transmission of the light generated by (emitted from) the light source 400 into the diffuser 500, as described in further detail below. In the particular embodiment illustrated, the light source 400 is connected (secured) to the carrier 300 via one or more heat stakes 410. It should be appreciated, however, that the light source 400 and the carrier 300 may be connected (secured) together in any suitable manner. For example, it is envisioned that the light source 400 and the carrier 300 may be mechanically connected (secured) via one or more fasteners (e.g., pins, rivets, screws, etc.), either fixedly or removably, that the light source 400 and the carrier 300 may be adhesively connected (secured), etc.

The diffuser 500 is supported by the carrier 300 and is located (positioned) axially between the shield 600 and the light source 400 such that the inner lens 200, the shield 600, the diffuser 500, and the light source 400 are spaced axially (longitudinally) from each other along the Y axis. More specifically, as seen in FIG. 2, the diffuser 500 is positioned inwardly (e.g., forwardly) of the shield 600, and the light source 400 is positioned inwardly (e.g., forwardly) of the diffuser 500.

In the particular embodiment illustrated, the diffuser 500 and the carrier 300 are configured for engagement in a snap (interference) fit arrangement, which facilitates releasable connection of the diffuser 500 and the carrier 300. More specifically, the main body portion 302 of the carrier 300 includes an upper end 310 (FIG. 3) that defines (includes) one or more projections 312 (e.g., ribs 314, lips, flanges, detents, etc.), which are configured for engagement (contact) with the diffuser 500 such that the diffuser 500 is positioned vertically below and axially forward of the projection(s) 312, which thereby secures the diffuser 500 and the carrier 300 in relation to each other. Embodiments are also envisioned, however, in which the carrier 300 may define (include) one or more additional projections 312 (e.g., located (positioned) at a lower end 316 thereof), as are embodiments in which the diffuser 500 and the carrier 300 may be mechanically connected (secured) via one or more fasteners (e.g., pins, rivets, screws, etc.), either fixedly or removably, adhesively connected (secured), and/or heat staked together. As such, the present disclosure envisions both releasable and fixed connections between the diffuser 500 and the carrier 300.

The diffuser 500 is configured and positioned to receive and disperse (distribute, spread) the light L (FIG. 2) generated by (emitted from) the light source 400 laterally, axially, and vertically through the lighting assembly 10 (e.g., along the axes X, Y, and Z, respectively), and may include (e.g., may be formed partially or entirely from) any material or combination of materials suitable for that intended purpose. For example, in the particular embodiment illustrated, the diffuser 500 includes (e.g., is formed partially or entirely from) an (optically clear) polymethyl methacrylate (e.g., a material with no optical effect on the light L generated by the light source). The dispersion (distribution, spreading) of light through the lighting assembly 10 facilitated by the diffuser 500 not only allows for a reduction in the number of light sources 400, but increases uniformity in the overall (aesthetic) appearance of the lighting assembly 10 by reducing (if not entirely eliminating) the formation and perception of hotspots. For example, in the particular embodiment illustrated in FIGS. 1-3, the diffuser 500 allows for the illumination of the chambers 14, 16 via a single, common light source 400 (e.g., board 402), rather than multiple light sources 400 (e.g., multiple boards 402).

The diffuser 500 includes a body 502 with: opposing (inner and outer) lateral ends 504, 506, respectively; opposing (upper and lower) ends 508, 510, respectively; and a leg 512 that is configured for insertion into the cavity 306 defined by the main body portion 302 of the carrier 300. The body 502 extends laterally (horizontally) along the axis X and vertically along the Z axis, and in parallel (or generally parallel) relation to the main body portion 302 of the carrier 300. The leg 512 extends axially (longitudinally) from the body 502 along the axis Y such that the leg 512 extends in transverse (e.g., orthogonal or generally orthogonal) relation to the body 502 and in parallel (or generally parallel) relation to the wings 304 on the carrier 300. More specifically, in the particular embodiment illustrated, the leg 512 extends from the body 502 so as to subtend an angle α therebetween that is equal (or approximately equal) to 90°. Embodiments in which the diffuser 500 may be configured such that the angle α is greater than or less than 90° are also envisioned herein (e.g., depending upon the particular configuration of the lighting assembly 10, the style of the vehicle 1, etc.) and would not be beyond the scope of the present disclosure.

In certain embodiments, such as that seen in FIG. 2, for example, the body 502 includes a notch 514 that extends inwardly (e.g., forwardly) towards the leg 512. The notch 514 defines angled surfaces 516, 518, which facilitate direction of the light L through the diffuser 500 in the manner illustrated. More specifically, upon contact with the angled surfaces 516, 518, the light L is redirected (vertically) towards the respective (upper and lower) ends 508, 510 of the body 502 (e.g., in parallel (or generally parallel) relation to the axis Z (FIG. 1)). To further enhance redirection of the light L, in certain embodiments, it is envisioned that the angled surfaces 516, 518 may include reflective characteristics (properties).

In the particular embodiment illustrated, the diffuser 500 (e.g., the notch 514) is configured such that the angled surfaces 516, 518 subtend an angle β therebetween that is equal (or approximately equal) to 90°. Embodiments in which the diffuser 500 may be configured such that the angle β is greater than or less than 90° are also envisioned herein (e.g., depending upon the particular configuration of the lighting assembly 10, the style of the vehicle 1, etc.) and would not be beyond the scope of the present disclosure.

Although shown as being integral (e.g., monolithic, unitary) in construction in the particular embodiment illustrated, embodiments also envisioned in which the diffuser 500 may include multiple sections (components) that are connected (secured) together. For example, it is envisioned that the body 502 and the leg 512 may be formed as discrete components that are subsequently connected (secured) together in any suitable manner (e.g., the body 502 and the leg 512 may be mechanically connected (secured) via one or more fasteners (e.g., pins, rivets, screws, etc.), either fixedly or removably, adhesively connected (secured), and/or heat staked together).

In certain embodiments of the disclosure, it is envisioned that the diffuser 500 may include an irregular outer surface configuration (e.g., to alter, vary, or customize light transmission therethrough). For example, it is envisioned that one (axial) end of the diffuser 500 (e.g., a rear end 520 of the body 502) may include texturing, knurling, etching, or the like and that the other (axial) end (e.g., a forward end 522 of the body 502) may include one or more steps, shoulders, bumps, ridges, or other such chiseling, whereby the ends 520, 522 include dissimilar (e.g., non-identical) configurations. Embodiments in which the ends 520, 522 may include identical configurations, however, are also envisioned herein, as are embodiments in which the locations of the configurations of the ends 520, 522 may be reversed (e.g., such that the end 520 includes texturing, knurling, etching or the like and the end 522 includes one or more steps, shoulders, bumps, ridges, or other such chiseling).

The shield 600 is connected (secured) to an inner surface (face) 206 of the inner lens 200, whereby the shield 600 is located (positioned) axially between the inner lens 200 and the diffuser 500 along the axis Y. More specifically, in the particular embodiment illustrated, the shield 600 is connected (secured) to the inner surface 206 of the inner lens 200 via one or more heat stakes 602 such that the shield 600 is in vertical alignment (or general vertical alignment) with the barrier 18 along the Z axis. It should be appreciated, however, that the shield 600 and the inner lens 200 may be connected (secured) together in any suitable manner and that the particular relative locations of the shield 600 and the barrier 18 may be varied without departing from the scope of the present disclosure. For example, embodiments are envisioned in which the shield 600 and the inner lens 200 may be mechanically connected (secured) via one or more fasteners (e.g., pins, rivets, screws, etc.), either fixedly or removably, adhesively connected (secured), etc., as are embodiments in which the shield 600 and the barrier 18 may be (vertically) offset from each other along the Z axis.

The shield 600 includes (e.g., is formed partially or entirely from) a non-optically clear (e.g., opaque) material or combination of materials, which allows the shield 600 to interfere with (e.g., block) light transmission from the light source 400 through the diffuser 500, the inner lens 200, and the outer lens 100. More specifically, the shield 600 interferes with (blocks) the linear transmission of light (through the diffuser 500) along an axis of transmission T, which extends in parallel (or generally parallel) relation to the axis Y. The shield 600 thus reduces (if not entirely eliminates) visibility of the light source 400 (e.g., the lighting element(s) 404) and perception of one or more axial hotspots, which may be perceived from the (rear) end 2 of the vehicle 1, as denoted by POV 2 in FIG. 2. As a result of the light source 400 being blocked by the shield 600, the light L ultimately passing through the lenses 100, 200 emanates from the diffuser 500, rather than directly from the light source 400.

In the particular embodiment illustrated, the shield 600 includes a body 604 with a U-shaped (or generally U-shaped) configuration. More specifically, the body 604 includes a pair of arms 606, 608 that are connected (secured together) by a bridge 610 so as to define a receptacle 612. The receptacle 612 receives the light L from the light source 400 that would otherwise pass linearly (axially, rearwardly)

through the diffuser 500 along the axis of transmission T, and, thus, increases the percentage of the light L that is blocked by the shield 600 so as to further reduce (if not entirely eliminate) the perception of one or more axial hotspots. It should be appreciated, however, that the particular configuration of the shield 600 may be varied in alternate embodiments without departing from the scope of the present disclosure (e.g., depending upon the particular configuration of the lighting assembly 10, the style of the vehicle 1, etc.).

In certain embodiments, it is envisioned that the body 604 of the shield 600 may include reflective characteristics (properties) to aid in the redirection of light through the diffuser 500. For example, it is envisioned that the arms 606, 608 and/or the bridge 610 may include one or more reflectors or reflective surfaces (not shown), which may be provided as discrete components of the shield 600 and/or incorporated (integrated) into the body 604 during construction of the shield 600 (e.g., in the form of a reflective coating that is applied to the body 604).

With continued reference to FIGS. 1-3, use and operation of the lighting assembly 10 will be discussed. Upon activation, the light L generated by (emitted from) the light source 400 is directed into the diffuser 500 (e.g., via the leg 512). Upon entering the diffuser 500, the light L is dispersed (distributed, spread) laterally (e.g., horizontally along the X axis), axially (e.g., longitudinally along the Y axis), and vertically (e.g., along the Z axis) through the lighting assembly 10 to thereby illuminate the inner lens 200. The light L entering the diffuser 500, however, is constrained (blocked) laterally (e.g., along the X axis) by the wings 304 of the carrier 300, which extend axially (rearwardly) beyond the lateral ends 504, 506 of the body 502 of the diffuser 500. Lateral concealment of the diffuser 500 by the wings 304 inhibits (if not entirely prevents) the transmission of light L from the lateral ends 504, 506 of the body 502, which reduces (if not entirely eliminates) the formation and perception of lateral hotspots that may be otherwise perceived from POV 1 (FIG. 2). In addition to being constrained laterally, the light L entering the diffuser 500 is constrained axially (e.g., longitudinally along the axes Y, T) by the shield 600, which reduces (if not entirely eliminates) the formation and perception of axial hotspots that may be otherwise perceived from POV 2 (FIG. 2). Reducing (if not eliminating) lateral and/or axial hotspots increases uniformity in the distribution of the light L through the lighting assembly 10 and the overall (aesthetic) appearance thereof.

Figure 4:
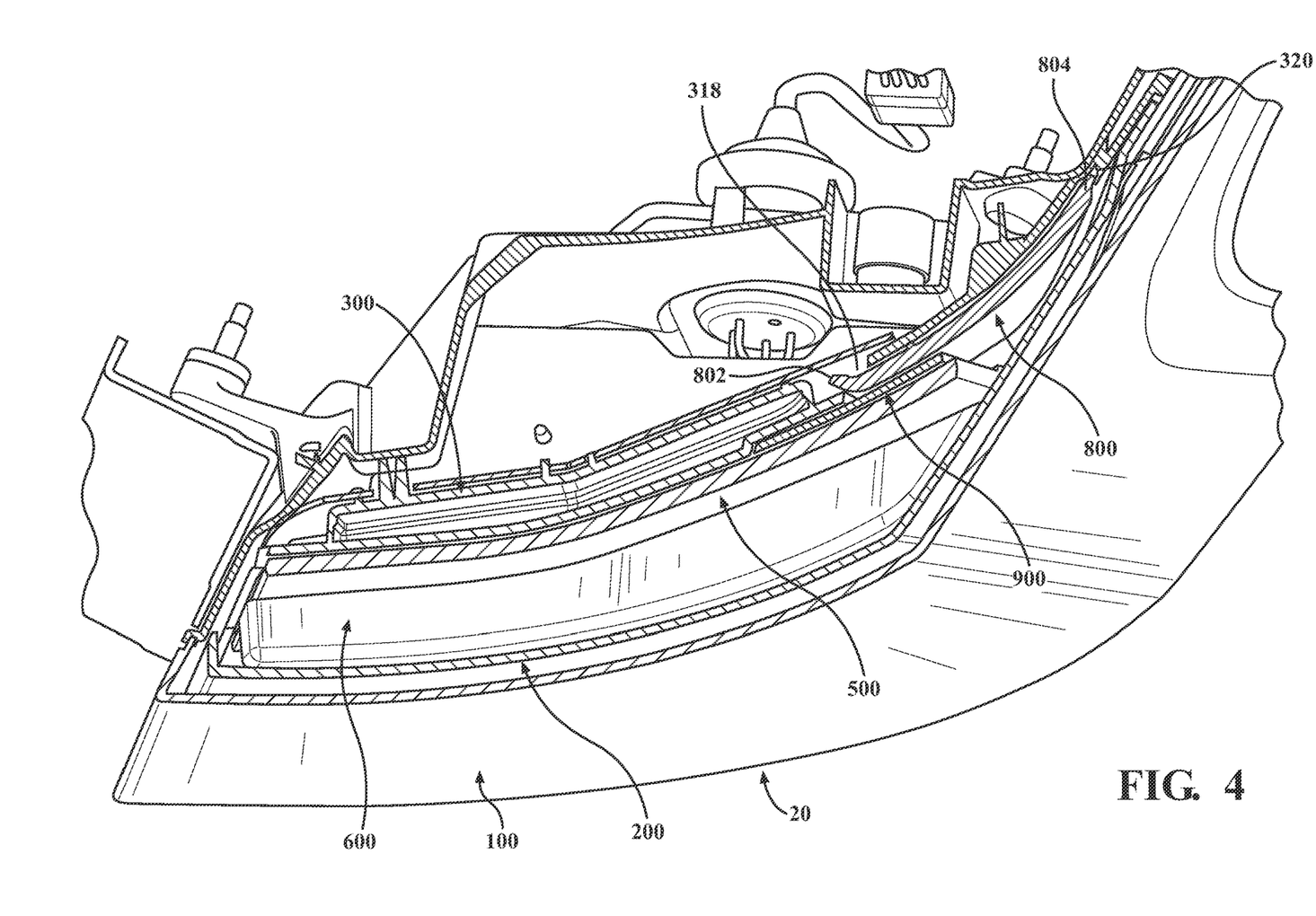
FIG. 4 is a (horizontal) cross-sectional view of an alternate embodiment of the lighting assembly shown in perspective.
Figure 5:
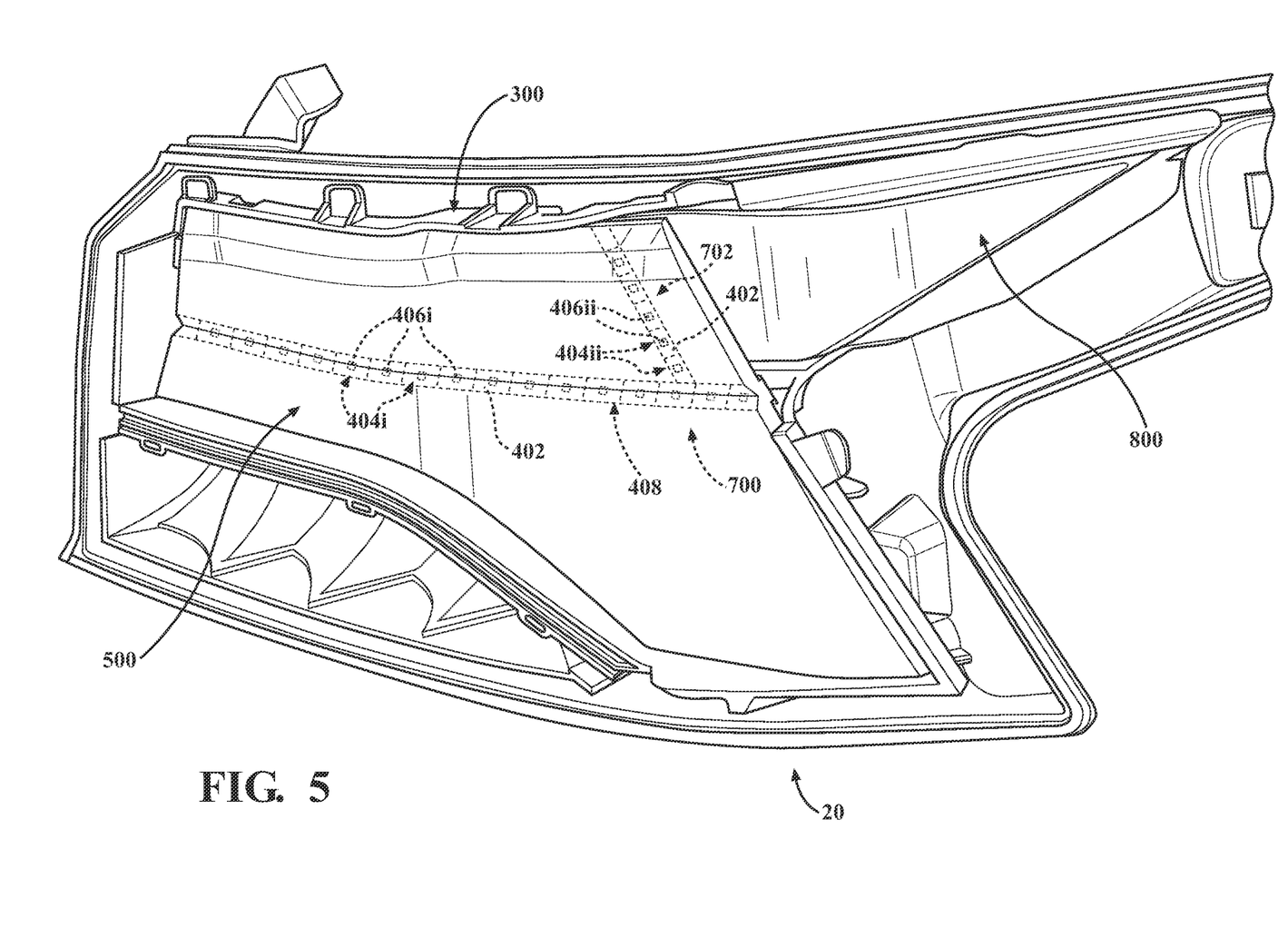
FIG. 5 is a partial, perspective view of the lighting assembly seen in FIG. 4.

With reference now to FIGS. 4 and 5, an alternate embodiment of the lighting assembly will be discussed, which is identified by the reference character 20. The lighting assembly 20 is substantially similar in both structure and function to the lighting assembly 10 discussed above and, accordingly, in the interest of brevity, will only be discussed with respect to any differences therefrom. As such, identical reference characters will be utilized to refer to elements, structures, features, etc., common to the lighting assemblies 10, 20.

The lighting assembly 20 includes: the outer lens 100; the inner lens 200; the carrier 300; a light source 700; the diffuser 500, which acts as a primary (first) diffuser; the shield 600, which acts as a primary (first) shield; a secondary (second) diffuser 800; and a secondary (second) shield 900.

The light source 700 is supported by (connected to) the carrier 300 such that the primary diffuser 500 is located (positioned) axially between the primary shield 600 and the primary array 408. More specifically, the primary diffuser 500 is spaced axially (longitudinally) from, and is positioned inwardly (e.g., forwardly) of, the primary shield 600, and the primary array 408 is spaced axially (longitudinally) from, and is positioned inwardly (e.g., forwardly) of, the primary diffuser 500, which allows the primary diffuser 500 to receive and disperse (distribute, spread) light from the primary array 408 through the lighting assembly 20. The light source 700 is substantially similar to the light source 400 (FIGS. 1-3), but for the inclusion of additional lighting elements 404, which are arranged into a secondary (second) array 702 that is oriented (angled) towards the secondary diffuser 800 such that light generated by (emitted from) the secondary array 702 is directed into the secondary diffuser 800. More specifically, the primary array 408 includes a first plurality of lighting elements 404$i$ (e.g., LEDs 406$i$) that are arranged in a first orientation, and the secondary array 702 includes a second plurality of lighting elements 404$ii$ (e.g., LEDs 406$ii$) that are arranged in a second orientation, which extends transversely in relation to the first orientation.

In certain embodiments, it is envisioned that the light source 700 may include a plurality of boards 402 that are provided as discrete components of the lighting assembly 20 to support the arrays 408, 702, as seen in FIG. 5. Embodiments are also envisioned, however, in which the arrays 408, 702 may be supported by a single board 402, and would not be beyond the scope of the present disclosure.

The secondary diffuser 800 is supported by the carrier 300 and is located (positioned) axially between the secondary array 702 and the inner lens 200. More specifically, the secondary diffuser 800 is spaced axially (longitudinally) from, and is positioned inwardly (e.g., forwardly) of, the inner lens 200, and the secondary array 702 is spaced axially (longitudinally) from, and is positioned inwardly (e.g., forwardly) of, the secondary diffuser 800.

As seen in FIG. 4, the secondary diffuser 800 includes a (first) lateral end 802, which is received by (inserted into) an opening 318 in the carrier 300, and an opposite (second) lateral end 804, which is received by (inserted into) a channel 320 (e.g., a slot, recess, notch, etc.) defined by the carrier 300, whereby the lateral ends 802, 804 of the secondary diffuser 800 are concealed by the carrier 300 such that the secondary diffuser 800 nests within the carrier 300. Nesting of the secondary diffuser 800 within the carrier 300 inhibits (if not entirely prevents) the transmission of light from the lateral ends 802, 804 thereof, which reduces (if not entirely eliminates) the formation and perception of (lateral) hotspots that may be otherwise perceived from the side(s) of the vehicle 1.

In the particular embodiment illustrated, the secondary diffuser 800 and the carrier 300 are configured for engagement in a snap (interference) fit arrangement, which facilitates releasable connection of the secondary diffuser 800 and the carrier 300, as discussed above in connection with the lighting assembly 10 (FIGS. 1-3). Embodiments are also envisioned, however, in which the secondary diffuser 800 and the carrier 300 may be mechanically connected (secured) via one or more fasteners (e.g., pins, rivets, screws, etc.), either fixedly or removably, as are embodiments in which the secondary diffuser 800 and the carrier 300 may be adhesively connected (secured) and embodiments in which the secondary diffuser 800 and the carrier 300 may be heat staked together. As such, the present disclosure envisions both releasable and fixed connections between the secondary diffuser 800 and the carrier 300.

The secondary diffuser 800 is configured and positioned to receive and disperse (distribute, spread) light from the secondary array 702 laterally, axially, and vertically through the lighting assembly 20. The relative positions of the carrier 300 and the secondary diffuser 800 (e.g., the respective positing of the lateral ends 802, 804 of the secondary diffuser 800 within the opening 318 and the channel 320) inhibit (if not entirely prevent) the transmission of light from the lateral ends 802, 804 of the secondary diffuser 800, thereby reducing (if not entirely eliminating) the formation and perception of hotspots so as to increase uniformity in the overall (aesthetic) appearance of the lighting assembly 20, as discussed above in connection with the lighting assembly 10.

The secondary shield 900 is secured (connected) to the carrier 300 such that the secondary shield 900 is located (positioned) axially between the secondary array 702 and the primary diffuser 500. More specifically, the secondary shield 900 is spaced axially (longitudinally) from, and is positioned inwardly (e.g., forwardly) of, the primary diffuser 500 and such that the secondary array 702 is spaced axially (longitudinally) from, and is positioned inwardly (e.g., forwardly) of, the secondary shield 900. Additionally, the secondary shield 900 is located (positioned) axially between the primary diffuser 500 and the secondary diffuser 800. More specifically, the secondary shield 900 is spaced axially (longitudinally) from, and is positioned inwardly (e.g., forwardly) of, the primary diffuser 500 and such that the secondary diffuser 800 is spaced axially (longitudinally) from, and is positioned inwardly (e.g., forwardly) of, the secondary shield 900.

It is envisioned that the secondary shield 900 and the carrier 300 may be secured (connected) together in any suitable manner. For example, embodiments are envisioned in which the secondary shield 900 and the carrier 300 may be configured for engagement in a snap (interference) fit arrangement, which facilitates releasable connection of the secondary shield 900 and the carrier 300, as are embodiments in which the secondary shield 900 and the carrier 300 may be mechanically connected (secured) via one or more fasteners (e.g., pins, rivets, screws, etc.), either fixedly or removably, adhesively connected (secured), and/or heat staked together.

The secondary shield 900 includes (e.g., is formed partially or entirely from) a non-optically clear (e.g., opaque) material or combination of materials, which allows the secondary shield 900 to interfere with (e.g., block) light transmission from the secondary array 702 into the primary diffuser 500, which reduces (if not entirely eliminates) visibility of the secondary array 702 and, thus, the perception of one or more axial hotspots.

With continued reference to FIGS. 4 and 5, use and operation of the lighting assembly 20 will be discussed. Upon activation, light generated by (emitted from) the primary array 408 and the secondary array 702 is directed into the primary diffuser 500 and the secondary diffuser 800, respectively. Upon entering the primary diffuser 500 and the secondary diffuser 800, the light is dispersed (distributed, spread) laterally, axially, and vertically through the lighting assembly 20 to thereby illuminate the inner lens 200. The light entering the primary diffuser 500, however, is again constrained (blocked) laterally by the wings 304 (FIG. 2) of the carrier 300 and axially by the primary shield 600, which reduces (if not entirely eliminates) the formation and perception of hotspots. Similarly, light entering the secondary diffuser 800 is constrained (blocked) laterally via respective positioning of the lateral ends 802, 804 of the secondary diffuser 800 within the opening 318 and the channel 320 defined by the carrier 300, which further reduces (if not entirely eliminates) the formation and perception of hotspots. Hotspot formation and perception is further reduced (if not entirely eliminated) by the secondary shield 900, which inhibits (if not entirely prevents) light emitted from the secondary array 702 from entering the primary diffuser 500.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "generally," "approximately," "substantially," and the like should be understood to include the numerical range, concept, or base term with which they are associated as well as variations in the numerical range, concept, or base term on the order of 25% (e.g., to allow for manufacturing tolerances and/or deviations in design). For example, the term "generally orthogonal" should be understood as referring to an arrangement in which the pertinent components (structures, elements) subtend an angle therebetween that is equal to 90° as well as an arrangement in which the pertinent components (structures, elements) subtend an angle therebetween that is greater than or less than 90° (e.g., ±25%).

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A lighting assembly for a vehicle, the lighting assembly comprising:
   a light source;
   a diffuser spaced axially from the light source and including first and second lateral ends, the diffuser being configured to receive and disperse light from the light source through the lighting assembly, wherein the diffuser includes an inner end facing towards the light source and an outer end facing away from the light source, the outer end including a notch defining angled surfaces configured to direct light through the diffuser;
   a lens spaced axially from the diffuser; and
   a shield located axially between the diffuser and the lens and laterally between the first and second lateral ends of the diffuser, the shield including a non-optically clear material so as to interfere with light transmission from the light source through the lens and thereby inhibit axial hotspot perception.

2. The lighting assembly of claim 1, wherein the light source is generally centralized relative to the lens.

3. The lighting assembly of claim 1, further comprising a carrier configured to support the diffuser and the lens.

4. The lighting assembly of claim 3, wherein the carrier extends axially beyond the first and second lateral ends of the diffuser to inhibit lateral hotspot perception.

5. The lighting assembly of claim 1, wherein the shield includes a body with a generally U-shaped configuration defining a receptacle to receive light from the light source.

6. The lighting assembly of claim 1, wherein the shield is supported by the lens.

7. The lighting assembly of claim 6, wherein the shield is heat staked to an inner surface of the lens.

8. A lighting assembly for a vehicle, the lighting assembly comprising:
   a light source;
   a diffuser spaced axially from the light source and configured to receive and disperse light from the light source through the lighting assembly, wherein the diffuser includes an inner end facing towards the light source and an outer end facing away from the light source, the outer end including a notch defining angled surfaces configured to direct light through the diffuser;
   a carrier positioned between the light source and the diffuser and defining a cavity configured to receive the diffuser such that the diffuser nests within the carrier, wherein the carrier extends laterally and axially beyond the diffuser to inhibit lateral transmission of light from the light source and thereby reduce perception of lateral hotspots;
   at least one lens positioned axially of the diffuser; and
   a shield positioned between the diffuser and the at least one lens so as to inhibit hotspot perception.

9. The lighting assembly of claim 8, wherein the diffuser is configured to disperse light transversely through the lighting assembly.

10. The lighting assembly of claim 8, wherein the at least one lens includes:
    a first lens spaced axially from the diffuser; and
    a second lens spaced axially from the first lens.

11. The lighting assembly of claim 10, wherein the first lens includes an optically clear material, and the second lens includes a non-optically clear material.

12. The lighting assembly of claim 8, wherein the light source includes a single light source.

13. The lighting assembly of claim 12, wherein the single light source includes at least one lighting element.

14. The lighting assembly of claim 13, wherein the at least one lighting element includes a plurality of LEDs.

15. A lighting assembly for a vehicle, the lighting assembly comprising:
    a carrier;
    a light source supported by the carrier and including a primary array and a secondary array;
    a primary diffuser supported by the carrier and spaced axially from the primary array, the primary diffuser including first and second lateral ends and being configured to receive and disperse light from the primary array within the lighting assembly;
    a secondary diffuser supported by the carrier and spaced axially from the secondary array, the secondary diffuser including first and second lateral ends and being configured to receive and disperse light from the secondary array within the lighting assembly;
    at least one lens supported by the carrier and spaced axially from the primary diffuser and the secondary diffuser;
    a primary shield located between the primary diffuser and the at least one lens, the primary shield including a non-optically clear material so as to interfere with light transmission from the primary array through the at least one lens; and
    a secondary shield extending between the carrier and the primary diffuser, the secondary shield including a non-optically clear material so as to interfere with light transmission from the secondary array into the primary diffuser.

16. The lighting assembly of claim 15, wherein the carrier is configured to conceal the first and second lateral ends of the primary diffuser as well as the first and second lateral ends of the secondary diffuser to inhibit light transmission from the first and second lateral ends of the primary diffuser and the first and second lateral ends of the secondary diffuser.

17. The lighting assembly of claim 15, wherein the primary array includes a first plurality of lighting elements arranged in a first orientation, and the secondary array includes a second plurality of lighting elements arranged in a second orientation transverse in relation to the first orientation.

18. The lighting assembly of claim 15, wherein the carrier, the primary diffuser, and the secondary diffuser are configured such that the primary diffuser and the secondary diffuser are releasably connected to the carrier.

19. The lighting assembly of claim 15, wherein the carrier, the primary diffuser, and the secondary diffuser are fixedly connected.

20. The lighting assembly of claim 19, wherein the primary diffuser and the secondary diffuser are heat staked to the carrier.

* * * * *